J. H. Gross,

Corn Dropper.

No. 111,200. Patented Jan. 24, 1871.

Witnesses:
D. S. Mabee
H. Misell

Inventor:
J. H. Gross
per Munn & Co.
Attorneys.

United States Patent Office.

JACOB H. GROSS, OF NIANTIC, ILLINOIS.

Letters Patent No. 111,200, dated January 24, 1871.

IMPROVEMENT IN CORN-DROPPERS.

The Schedule referred to in these Letters Patent and making part of the same.

*To all whom it may concern:*

Be it known that I, JACOB H. GROSS, of Niantic, in the county of Macon and State of Illinois, have invented a new and improved Corn-Dropper and Check-Row; and I do hereby declare that the following is a full, clear, and exact description thereof, which will enable others skilled in the art to make and use the same, reference being had to the accompanying drawing forming part of this specification.

My invention relates to machines for simultaneously dropping corn and checking off the rows.

I will first describe my invention in connection with all that is necessary to a full understanding thereof, and then clearly point it out in the claim.

Similar letters of reference indicate corresponding parts.

Figure 1:
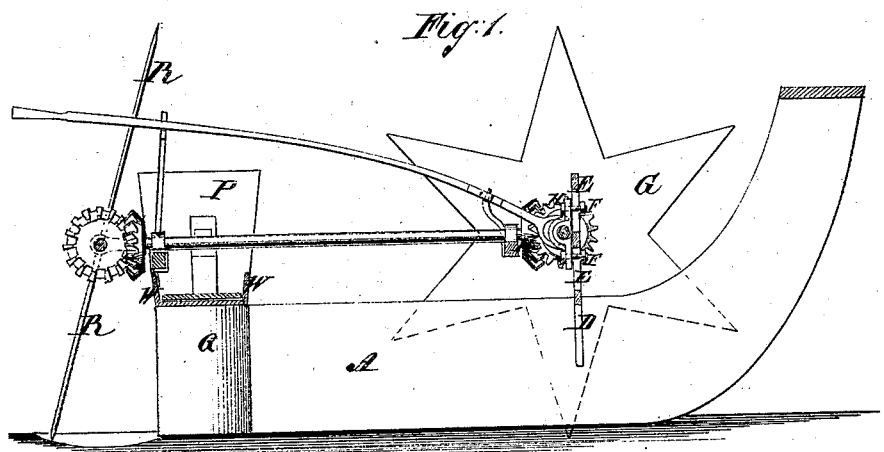
Figure 1 is a sectional elevation taken on the line *x x* of fig. 2.
Figure 2:
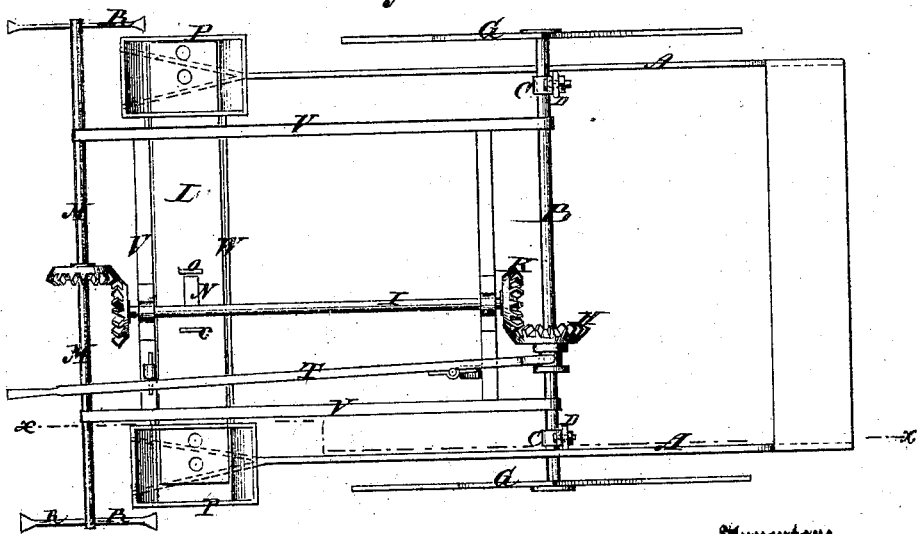
Figure 2 is a top view of my improved machine.

A represents a pair of runners, of any suitable kind; and

B, a transverse shaft, mounted thereon, near the front, by clamping the journal boxes C to vertical bars D, which have elongated holes E for the clamping-bolts F, so that the shaft may be adjusted higher or lower on the said bars.

G represents the star-wheels; they are mounted on the shaft outside the runners, so that the points will engage with the ground, as the runners move along, to cause them to be revolved; they should be of such size as to make two movements of the dropping slide to one revolution, but they may be large enough to make three or four.

H is a gear-wheel, placed on shaft B, to turn the shaft I, having a wheel, K, gearing with it, and working the dropping-slide L and the check-shaft M. It moves the dropping-slide L by means of the tappet N acting on the studs O, imparting two movements to it at each revolution.

This slide has two pockets at each end, inside of the hoppers P, which drop alternately, being suitably arranged relatively to the holes in the bottom of the hoppers, which are arranged over the scrapers Q, attached to the rear ends of the runners, for scraping out a channel for the corn to fall into.

The check-shaft M is provided with two arms R, at each end, which strike the ground at each revolution of the said shaft and make checking marks thereon. These arms are so arranged on the shaft, and the latter is so geared relatively to the drop-slide, that the marks will be made exactly by the sides of the places where the corn is dropped, thereby checking the rows perpendicular to the movements of the machine so that the rows may be made regular each way.

The driving-wheel H is made to slide on the shaft B, and provided with a shifting lever, T, extending rearward, so that the attendant walking behind may shift it out and in, as required, at the ends of the rows, to stop the action of the dropper and marker when turning, and to set them in gear again after turning.

The bar U, at the rear, which supports the rear end of shaft I, also supports the bars V, which project rearward and support the shaft M, and these bars are supported at the front on the shaft B; and the said bar V is supported on the hoppers which are connected together by the trough W, which is designed to be attached to the runners so as to be readily detached, so that the whole operating apparatus may be readily applied to or removed from the runners, the plates D being also detachably connected.

Having thus described my invention,

I claim as new and desire to secure by Letters Patent—

The journal-boxes C C, vertical slotted bars E, and bolts F, combined as described with shaft B, for the purpose of adjusting the star-wheels at a greater or lesser height.

JACOB H. GROSS.

Witnesses:
R. A. CAMPBELL,
W. W. R. SMITH.